Sept. 24, 1929.   H. NAATZ   1,729,516
VALVE FOR AIRSHIPS, BALLOONS, AND THE LIKE
Filed Sept. 1, 1928
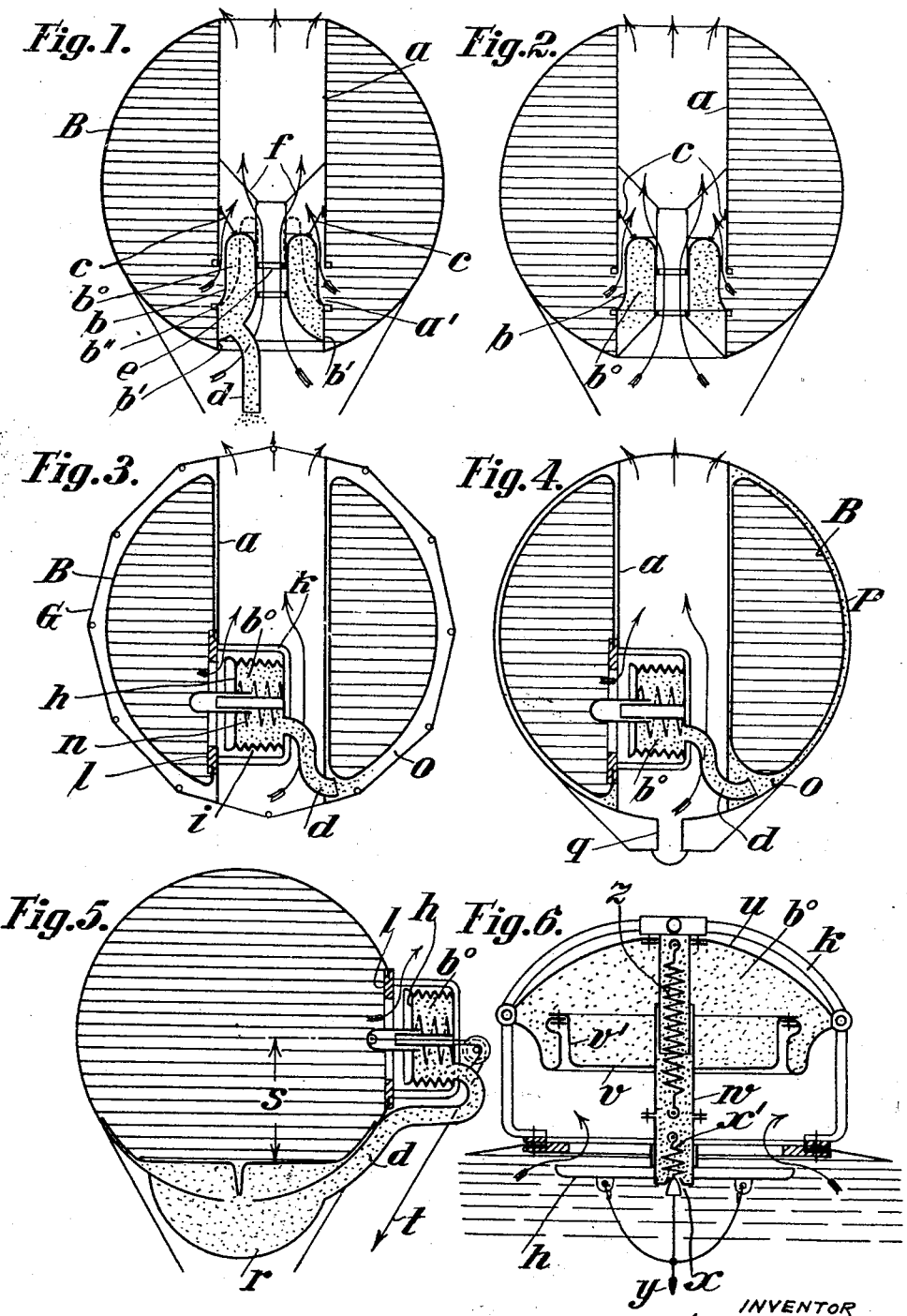
INVENTOR
Hermann Naatz
BY Dowell & Dowell
his Attorneys.

Patented Sept. 24, 1929

1,729,516

UNITED STATES PATENT OFFICE

HERMANN NAATZ, OF BERLIN-WILMERSDORF, GERMANY, ASSIGNOR TO WASSER-UND LUFT-FAHRZEUG G. M. B. H., OF BERLIN, GERMANY

VALVE FOR AIRSHIPS, BALLOONS, AND THE LIKE

Application filed September 1, 1928, Serial No. 303,510, and in Germany September 5, 1927.

Automatic deflating devices in the form of valves, fabric leaf valves and the like (hereinafter referred to, generically, as valves) employed on airships and balloons of all kinds, are so disposed that the movable member of the valve faces, on the one side, the gas enclosed in the balloon and, on the other side, the space into which the discharge takes place. Consequently, the movement of the said valve member depends (apart from the pressure of a special loading device) upon the pressure difference between the gas space and the evacuation space. Since a powerful draught, which induces a pressure drop, prevails in this latter space, which is often arranged in the form of a shaft or trunk passing through the body of the balloon, the danger arises of an unintentional influence being exerted on the valve members. For instance, draughts set up in the shaft by the action of heat or the like, may cause the valve to open at a time when it ought to be shut. The known valve arrangements also fail in cases where the valve is intended to open upon a certain difference in pressure occurring between the gas space and another remote space, such as the ballonet or the lower cell space of a non-rigid airship.

My present invention provides a valve which avoids the said drawbacks of the known valves and is suitable for a variety of uses. According to my invention, the movable member of the valve is provided with a readily collapsible receiver, or is designed as a readily collapsible receiver, the interior of which is connected (as by means of a pipe or flexible tube) with the space that determines the pressure difference in relation to the gas space, whereas the side remote from the valve is held in a fixed position. In operating the valve, the receiver must be compressed, and the opening and closing depends entirely on the pressure difference between the gas space and the interior of the receiver, but not on the pressure in the evacuation space.

Typical embodiments of the invention are illustrated diagrammatically on the accompanying drawing whereon:—

Figs. 1 and 2 show the application of the invention to a free balloon, represented in cross section;

Fig. 3 shows its application to a rigid airship; also represented in section;

Fig. 4 shows its application to a non-rigid airship;

Fig. 5 its application to a captive balloon; and

Fig. 6 is an axial section, on a larger scale, of a free-balloon valve.

The discharge shaft $a$ of the free-balloon body B (Fig. 1) is provided at the lower end with a valve, the movable member $b$ of which is in the form of a double-walled, cylindrical flexible-tube or bag, and is held in position in the shaft by cords $c$. The shaft wall $a$ is provided with one or more annular slots $a^1$, which are normally covered by the outer wall of the member $b$. The inner wall of the movable valve member $b$ is held in position in the shaft by rings $e$ and slings $f$. Below the slots $a^1$, the movable valve member $b$ is secured to the shaft wall, at $b^1$ as regards its inner wall and at $b''$ as regards its outer wall. A flexible tube $d$ proceeds from the interior space $b^0$ of the member $b$, and opens into the outer air at a little distance from the body of the balloon.

As soon as the gas and air currents (represented by the feathered arrows) enter in the horizontally hatched gas space of the balloon body B, air from the outside flows through the flexible tube $d$ into the space $b^0$, and the movable valve member $b$ assumes a more or less contracted shape (indicated by continuous or dotted lines in Fig. 1) according to the degree of positive pressure in the gas space. It is evident that the portion of the valve member $b$ that is within the sphere of influence of the slots $a^1$ is solely under the influence of the difference in pressure between the gas and stagnant outer air, and can perform its movements unaffected by the draught in the shaft $a$, in consequence of which the action occurs exactly to the extent desired. In addition to the reliability of action of the valve, advantages are obtained in connection with the shaft, which can be made narrower than heretofore, especially in its lower part, thereby preventing a downward discharge of gas with greater certainty.

Fig. 2 represents a simplified form, which is ample in some cases. Here, the portion, which, in the embodiment according to Fig. 1, secured the inner wall of the movable valve member $b$ to the shaft wall at $b^1$, is omitted, and the bag-shaped interior space $b^0$ is in direct communication with the lower end of the shaft space. The result of this arrangement is that the pressure is, at most only slightly affected by the draught in the shaft.

In the embodiment according to Fig. 3, the shaft $a$ passes through the gas cell B of a rigid airship G. The movable valve member takes the shape of a disc $h$, to the outer side of which is attached a bellows $i$ which again encloses a space $b^0$. The bellows $i$ is mounted on a frame $k$. Leading from the space $b^0$ is a flexible tube $d$ which opens into the space $o$ between the outer envelope of the airship G and the balloon member. A spring $n$ tends to hold the movable valve member $h$ against its seat $l$. In this case also, it is evident that since the bellows $i$ enclosing the space $b^0$ covers the whole outer face of the valve disc $h$, the working of the valve is independent of the pressure in the shaft space $a$ and, apart from the tension of the spring, depends solely on the pressure difference between the gas space B and the external space $o$.

The embodiment according to Fig. 4, for a non-rigid airship, corresponds in all essentials to the embodiment according to Fig. 3. The only difference is that, in this case, the space $o$ between the gas space B and the outer envelope P of the non-rigid airship, into which the flexible tube $d$ opens, is under a higher pressure, because the airship is of the non-rigid type. The shaft space $a$ is connected, either with the outer air or the gangway, by means of a conduit $q$. Here also it is evident that the valve is solely under the pressure of the column of gas. The valve springs can be easily adjusted so that the valve will open when the intermediate space $o$, or the ballonet, is empty, or also somewhat later. This arrangement provides a reliably and accurately operating automatic valve whereas, hitherto, in the case of non-rigid airships, the gas valves had always to be set in operation by mechanical means on the ballonet becoming empty.

Fig. 5 reresents the suitable application of the new valve to captive balloons. The valve is of the same design as in Figs. 3 and 4, but in this case the flexible tube $d$ leads to the keel bulge $r$, in order that the ballonet may become completely empty. The valve opens when the column of gas $s$ attains a value corresponding to the empty condition of the ballonet. At the same time, the valve can be opened by means of a cord $t$, enabling it to be actuated at will, and can thus be utilized as a manœuvring valve.

Fig. 6 shows an embodiment of the valve, which represents a modification of the known free-balloon valve, and shows how the new arrangement is used with advantage for regulating the altitude of the free balloon or the like. In this instance the space $b^0$ is enclosed by a bag-shaped member $u$, suspended on bows $k$. The lower surface of the member $u$ forms a disc $v$ with upturned rim $v^1$ over which the elastic surface of the wall of the member $u$ is adapted to roll. A tube $w$ connects the disc $v$ with the valve disc $h$. At the lower end of said tube $w$ is attached an auxiliary valve $x$ which is under the closing action of a spring $x^1$, but is normally kept open by a cord (provided with suitable weighting means $y$) engaging a movable member. Hence the gas from the ballonet forces its way through the valve into the space $b^0$. The valve disc $h$ is kept closed by the action of the spring $z$.

When, in order to check the ascent of the balloon, the valve X is closed by detaching the weight $y$, expansion of the gas in the space $b^0$ will open the valve disc $h$, whereupon the balloon will cease to rise and will gradually tend to fall, the gas in the space $b^0$ contracting and again causing the main valve to close. If the valve $x$ is designed so as not to close completely, or is provided with a small balance orifice, the reclosing of the main valve is accelerated and the descent of the balloon is prevented. In this manner it is possible to bring the free balloon conveniently to a standstill during the ascent, a matter which is otherwise difficult and is satisfactorily performed only in the case of entirely non-rigid balloons.

The structural design of the various valve devices is not limited to the special purpose described. For example, the type of the enclosed space according to Fig. 6 can be employed with advantage for the arrangements according to Figs. 3-5.

I claim:—

1. A valve structure for use in closing a valve port in the gas space of an airship, balloon or the like, comprising a collapsible receiver, means mounting the receiver for expansion and contraction towards and away from the valve port, and a valve member movable with the receiver.

2. A valve structure for use in closing a valve port for the gas space of an airship, balloon or the like, comprising a collapsible receiver, means mounting the receiver for expansion and contraction towards and away from the valve port, and a valve member integral with the receiver.

3. A valve structure for use in closing a valve port for the gas space of an airship, balloon or the like, comprising a collapsible receiver one wall of which constitutes a valve, and means for mounting said receiver for expansion and contraction towards and away from the valve port.

4. In an airship, balloon or the like, valve means for closing the gas space comprising a movable valve member controlling a valve port to said gas space, and a collapsible receiver on the side of the valve member remote from the gas space, whereby opening and closing of the valve depends on the pressure difference between the gas space and the interior of the receiver.

5. In an airship, balloon or the like, valve means for controlling the gas space, comprising a collapsible receiver, means mounting the receiver for expansion and contraction towards and away from a valve port to said gas space, and a valve member movable with the receiver.

6. In an airship, balloon or the like, valve means for controlling the gas space, comprising a collapsible receiver one wall of which constitutes a valve, and means mounting said receiver for expansion and contraction towards and away from a valve port to said gas space.

7. In an airship, balloon or the like, valve means for controlling the gas space, comprising a collapsible receiver one wall of which constitutes a valve, means mounting said receiver for expansion and contraction towards and away from a valve port to said gas space, and a pipe open to the interior of the receiver.

8. In an airship or balloon or the like airborne vessel having a gas space traversed by an air-shaft, means for closing a valve port for the gas space, comprising a collapsible receiver one wall of which constitutes a valve, and means mounting said receiver in the shaft for expansion and contraction towards and away from said port.

9. In an airship or balloon or like air-borne vessel having a gas space traversed by an air-shaft, means for closing a valve port for the gas space, comprising a collapsible receiver one wall of which constitutes a valve, means mounting said receiver in the shaft for expansion and contraction towards and away from said port, and a pipe establishing communication between the interior of the receiver and a space without said air-shaft.

In testimony whereof I affix my signature.

HERMANN NAATZ.